United States Patent [19]

Inaba et al.

[11] Patent Number: 4,767,200
[45] Date of Patent: Aug. 30, 1988

[54] LENS MOUNTING

[75] Inventors: Hiroyoshi Inaba; Kazuya Matsuda, both of Kanagawa, Japan

[73] Assignee: Canon Kabushiki Kaisha, Tokyo, Japan

[21] Appl. No.: 119,964

[22] Filed: Nov. 13, 1987

[30] Foreign Application Priority Data

Dec. 23, 1986 [JP] Japan .................. 61-197916[U]

[51] Int. Cl.⁴ .............................................. G02B 7/11
[52] U.S. Cl. .................................. 350/429; 350/255; 354/286
[58] Field of Search ............... 350/429, 430, 252, 254, 350/255; 354/286

[56] References Cited

U.S. PATENT DOCUMENTS 3,506,338 4/1970 Holderbaum .
4,255,020 3/1981 Yukio ................................. 350/430
4,484,800 11/1984 Tamura ............................... 350/429
4,636,042 1/1987 Komine et al. .................... 350/429

FOREIGN PATENT DOCUMENTS 60-41533 12/1985 Japan .

Primary Examiner—John K. Corbin
Assistant Examiner—Loha Ben
Attorney, Agent, or Firm—Fitzpatrick, Cella, Harper & Scinto

[57] ABSTRACT

A lens mounting includes a movable cam having a cam portion formed to a convex shape, an axially movable member having a cam follower portion sliding on one of side surfaces of the convex cam portion of the cam in which a cam lift is formed. A lens is arranged to move axially in response to axial movement of the axially movable member, and a leaf spring pressing the other side surface of the convex cam portion urges the cam follower portion toward the one side surface of the convex cam portion. The leaf spring has its pressing portion at a position of the convex cam portion and is fixed to the axially movable member at a position displaced to a direction almost perpendicular to the optical axis from the pressing portion.

7 Claims, 3 Drawing Sheets

LENS MOUNTING

BACKGROUND OF THE INVENTION

1. Field of the Invention

This invention relates to a mechanical mounting for a zoom lens and, more particularly, to a mechanism for moving, for example, a variator and a compensator when zooming.

2. Description of the Related Art

The conventional mechanical mounting for zoom lens is constructed as shown in FIG. 7. In the case of the type having a focusing lens $L_1$, a magnification varying lens $L_2$, a compensation lens $L_3$, and an image forming lens $L_4$, the focusing lens $L_1$ is carried on a focusing lens holder 1. This focusing lens holder 1 is linked to a lens fixing barrel 2 by a helicoid connection so that the focusing lens $L_1$ is axially moved by rotating the focusing lens holder 1.

Also, the magnification varying lens $L_2$ and the compensation lens $L_3$ are held in lens holders 3 and 4, respectively. These lens holders 3 and 4 have peripheral penetration holes freely slidable on guide bars 5a and 5b so that they can axially move. The movable amounts of the magnification varying lens $L_2$ and the compensation lens $L_3$ are controlled by camming slots 6a and 6b bored in a cam sleeve 6 rotatably fitted in the inner diameter of the lens fixing barrel 2. The cam sleeve 6 is linked to rotate in response to the rotation of a zoom operating ring 7 fitted on the outer periphery of the lens fixing barrel 2 through a convex portion 7a provided in the zoom operating ring 7. Shaft rollers 3a and 4a which are fixedly mounted on the lens holders 3 and 4 engage in the camming slots 6a and 6b of the cam sleeve 6, respectively. By rotating the zoom operating ring 7, the lens holders 3 and 4 are linearly moved along an optical axis in response to the respective loci of the camming slots 6a and 6b.

Incidentally, in such a zooming mechanism, the cam sleeve 6 uses metal material such as aluminum, and the camming slots 6a and 6b of uniform width are formed in the cylindrical surface by machining.

For this reason, the production cost of the cam sleeve 6 becomes high. Also, because the cam sleeve 6 is made up of metal, the total weight of the lens mounting tends to become heavy. Thus, the cam sleeve 6 has been an obstacle to a reduction of the cost and weight of the lens mounting.

So, recently a proposal has been made that this cam sleeve is formed in a mold by using synthetic resin (plastic) material to achieve the reduction of the cost and weight. But, since the camming slots which can be said to be the heart of the zoom lens control, necessitate very high precision fabrication, the production technique of this kind hardly enables the required cam lift accuracy and camming slot uniformity to be obtained. Another drawback was that, because the use of the slots make the structure of the mold complicated, the price of the mold became high.

Also, as an improved proposal, U.S. Pat. No. 4,386,829 is known. This proposal is that the cam of the cam sleeve is formed to a ridge and, further, pressing means in the form of a spring is provided for enabling the cam follower to slide always on one shoulder of the cam ridge, thereby giving an advantage that the cost of the cam sleeve is lowered, the accuracy of camming movement is improved, and the attitude difference is limited to a minimum.

It should be noted, the same improvements may otherwise be achieved as in U.S. Pat. No. 3,506,338 and Japanese Utility Model Publication No. Sho 60-41533.

SUMMARY OF THE INVENTION

An object of the present invention is to provide a lens mounting which is a further improvement over the prior known lens mounting by the above-described improved proposals, and enables particularly excellent performance to be obtained.

DETAILED DESCRIPTION OF THE PREFERRED EMBODIMENTS

Figure 1:
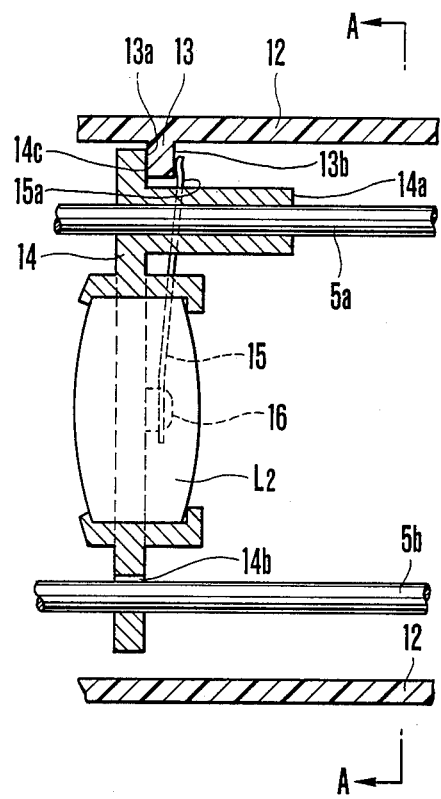
FIG. 1 is a longitudinal section view of the main parts of an embodiment of a zoom lens mounting according to the invention.
Figure 2:
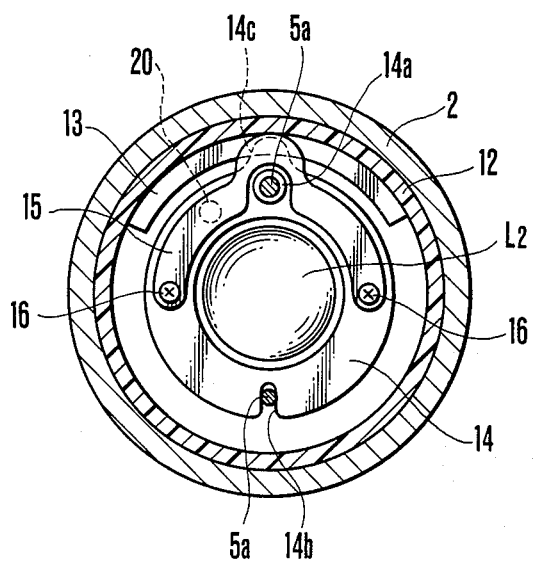
FIG. 2 is a cross-sectional view looked from arrows A of FIG. 1.

FIG. 1 is a fragmentary sectional view illustrating one embodiment of the zoom lens mounting according to the invention, and FIG. 2 is a cross-sectional view taken along a line A—A of FIG. 1. It should be noted, FIG. 1 illustrates only those parts which are necessary the description of the invention, while the other parts are omitted. Also, the same instituting the structure in this embodiment and that shown in the conventional example are denoted by the reference numerals cited in the conventional example, and, as they are embodied in the structure of this embodiment, their description is omitted.

In the figures, a lens holder 14 holds the magnification varying lens $L_2$, and has a tubular portion 14a of a penetration hole formed in an upper part thereof and in slidably fitted on a guide bar 5a, and has a cutout recess 14b formed in a lower part thereof and is fitted on a guide bar 5b. Further, above the tubular portion 14a, a cam follower portion 14c contacting a front side surface of a convex cam portion 13 (to be described later) for the magnification varying system is extended as a unit. A leaf spring 15 is formed to a flat, almost semicircular shape, and both ends of it are mounted on the rear surface of the lens holder 14 by respective screw fasteners 16 in such a manner as to straddle the tubular portion 14a of the lens holder 14. Its top portion 15a of flat inverted letter "U" shape is resiliently pressed on the rear side surface of the convex cam portion 13 for the magnification varying system. By virtue of this resilient force of the leaf spring 15, the cam follower portion 14c is always maintained in contact with the convex cam portion 13 for the magnification varying system.

It should be noted, though not shown in FIG. 1, a lens holder for the compensation lens $L_3$ to be arranged in rear of this magnification varying lens $L_2$ is formed similarly to the lens holder 14, but set up in a vertically reversed fashion relative to the lens holder 14 on the guide bars 5a and 5b.

Figure 3:
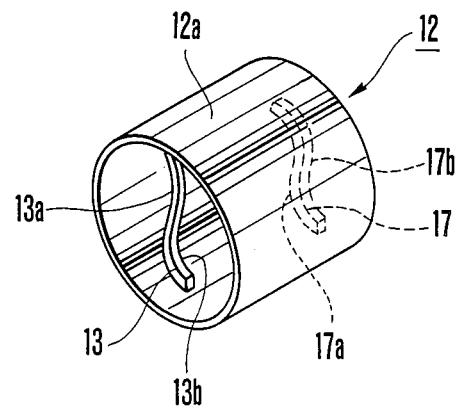
FIG. 3 is a perspective view of the cam sleeve.
Figure 4:
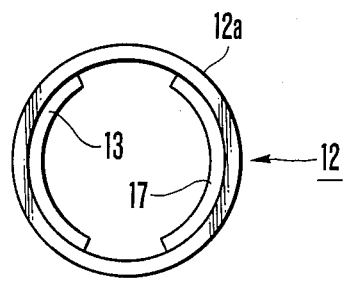
FIG. 4 is a side view of the same.

A cam sleeve 12 is fitted in the inner diameter of the lens fixing barrel 2. As shown in FIGS. 3 and 4, a convex cam portion 13 for the magnification varying system and another convex cam portion 17 for the compensation system are formed on the inner wall of the cylindrically shaped sleeve body 12a on either side of the optical axis in an axially spanning relation and in circumferential unison. For the convex cam portion 13 for the magnification varying system, the cam follower portion 14c abuts on its front side surface 13a (hereinafter called "main" camming surface), and the top portion 15a of the leaf spring 15 abuts on its rear side surface 13b (hereinafter called "auxiliary" camming surface), so that the convex cam portion 13 is cramped by the cam follower portion 14c and the leaf spring 15. The bias force of the leaf spring 15 is minimized so as just to maintain the cam follower portion 14c in abutting engagement on the main camming surface 13a.

And, when the cam sleeve 12 rotates in response to rotation of the zoom operating ring 7, because the cam follower portion 14c always resiliently abuts on the main camming surface 13a, the cam follower portion 14c is guided along the main camming surface 13a to axially move the lens holder 14 to effect zooming. Of course, the lens holder for the compensation system is moved along with it.

That is, the cam sleeve 12 is of such simple structure that the convex cam portions 13 and 17 are provided on the inner surface of the sleeve body 12a. Therefore, by using a synthetic resin (plastic) material and molding means, the convex cam portions 13 and 17 are easily formed in unison with the sleeve body 12a. Also, the cam follower portions are guided along the main camming surfaces 13a and 17a of the convex cam portions 13 and 17. Therefore, the predetermined cam lift may be set only in this main camming surface 13a, 17a. For the auxiliary camming surfaces 13b and 17b, on the other hand, their distances to the the main camming surfaces 13a and 17a may be set somewhat roughly in uniformity. Because there is no necessity of high accuracy, the process of manufacturing the mold becomes simpler.

Also, because the lens holder 14 is maintained in abutting engagement on the main camming surface 13a of the convex cam portion 13 by the resilient force of the leaf spring 15, axial looseness if prevented from occurring. Thus, the zoom image plane shift and the image plane attitude difference can be minimized.

It should be noted, though, in the above-described embodiment, the screw fasteners 16 have been used in fixing both lower end portions of the leaf spring 15 to the lens holder 14, in the case of forming the lens holder of the synthetic resin in the mold, the lens holder and the leaf spring may be made up as a unit.

Figure 6:
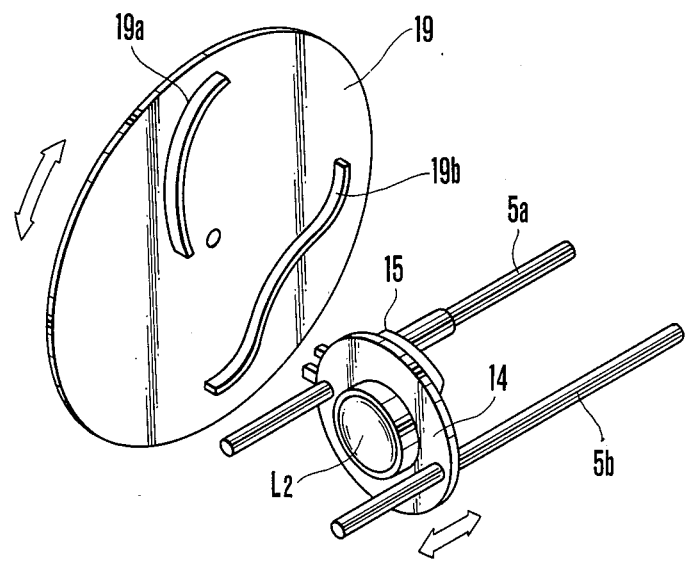
FIGS. 5 and 6 are perspective views of other embodiments of the invention.
Figure 5:
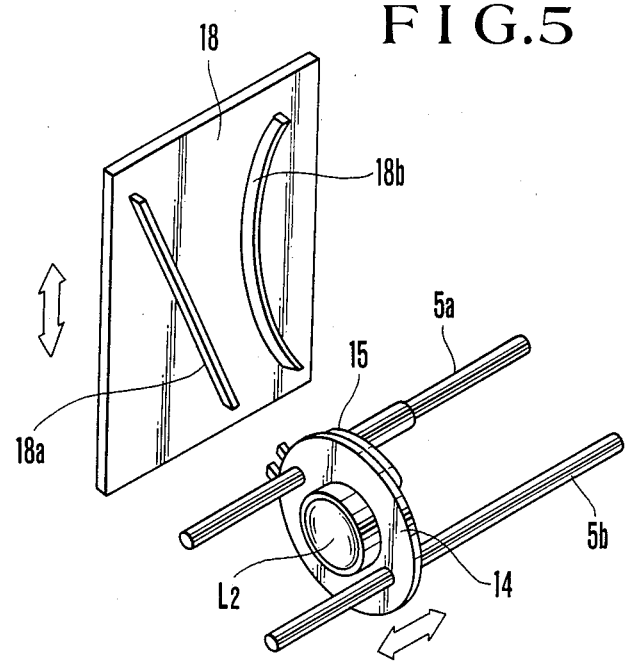
Figure 7:
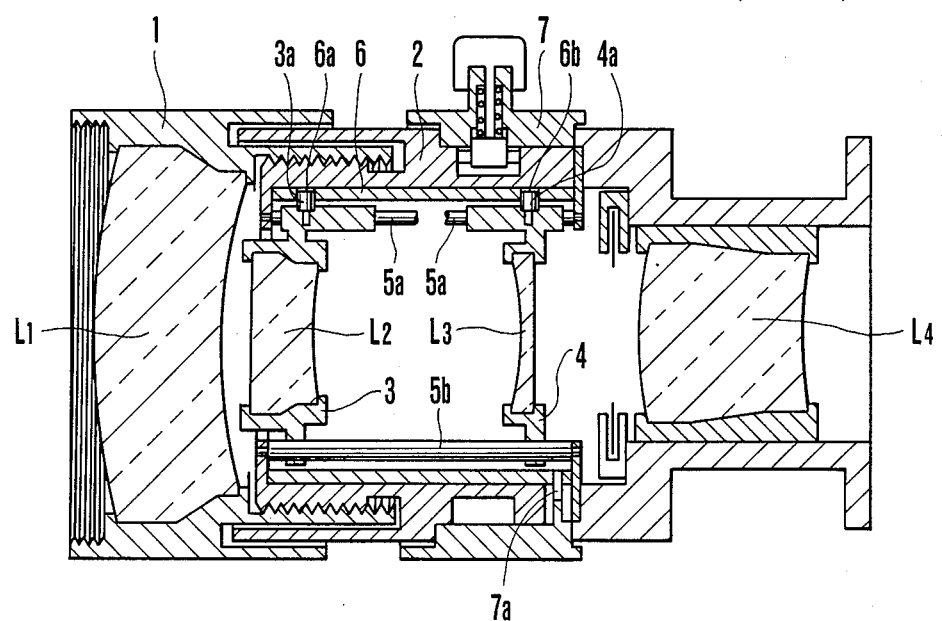
FIG. 7 is a longitudinal section view of the conventional zoom lens mounting.

Also, the cam has been formed to be of a cylindrical shape. But, as shown in FIGS. 5 and 6, a plate cam 18 of the vertically movable type or a disc cam 19 of the rotatable type respectively may be used instead.

Also, the above-described convex cam portion may be provided not only for the zooming function, but also for the focusing function, as a matter of course.

As has been described above, according to the present invention, the camming portion of the cam is made convex with an advantage that the cam can be formed in a mold of simple structure without undercuts. Also, the camming portion is sandwiched between the cam follower and the pressing means with the advantage that only one side surface of the camming portion may be considered when the cam lift tolerance is determined. Therefore, the necessity of high uniformity of the width of the camming slot as in the prior art is obviated. Further, the use of the pressing means removes the backlash. This leads to minimizing the shift and the attitude difference of the image plane during zooming.

Also, in the present invention, the means urging the cam follower portion of the movable member such as the lens holder to slide always on the main camming surface of the convex cam portion of the cam sleeve is constructed in the form of a leaf spring, and this leaf spring is fixed in an offset position in a direction almost perpendicular to the optical axis from the auxiliary camming surface of the convex cam portion on which the pressed point lies. Therefore, the spring constant at the pressed point of the leaf spring can be easily set low, and a weak pressing force (cramping force) can be produced without requiring a space in the direction of the optical axis, thereby giving an advantage that the auxiliary camming surface may be rough. That is, the cam lift of high precision accuracy is set up only to the main camming surface. The auxiliary camming surface does not necessitate a higher precision accuracy than that for the acceptable maximum range of variation of the distance to the main camming surface.

In the one of the prior known proposals for improvements which uses the presser (U.S. Pat. No. 4,386,829), on the other hand, a coil spring is arranged adjacent the pressed point and oriented to the axial direction. Therefore, the spring constant is determined regardless of the support point, depending only on the coil spring itself. In order to utilize a spring constant at a low value so that a satisfactory weak pressing force is obtained, it is necessary to arrange a space in the direction of the optical axis. Such arrangement of the space is actually difficult, so that it is impossible to provide a spring of low constant. Suppose a coil spring of high constant is used for pressing the auxiliary camming surface. Then, if the lift of the auxiliary camming surface were accurately related to the cam lift of the main camming surface, there would be no problem, but for the rough tolerance given to the lift of the auxiliary camming surface, the springing force changes to a large extent, causing the operating force to change each time the thickness of the camming portion at the pressed point changes as the cam sleeve rotates. This gives rise to a problem on the feeling of the zoom actuator.

It should be noted, in the above-described embodiment, that member which has the cam follower portion 14c, (or the lens holder 14), has been supported by a plurality of guide bars 5a and 5b to be movable only in the axial directions. This permits only one contact point to suffice for the cam follower portion 14c sliding on the convex cam portion 13 of the cam sleeve 12. Thereby, only one piece of leaf spring 15 as the additional part is sufficient. Thus, a large increase in cost is not involved.

Also, in the above-described embodiment, for the leaf spring 15 as the source of a force urging the cam follower portion 14c to contact always on the main camming surface 13a of the convex cam portion 13, its top portion 15a is made to contact directly with the auxiliary camming surface 13b of the convex cam portion 13 when this cam follower portion 14c and the leaf spring 15 cramps the convex cam portion 13, thereby giving an advantage that the number of parts to be added can be minimized in constructing the lens mounting of the invention.

Also, in the above-described embodiment, the leaf spring 15 has its base covering the side surface of the lens holder 14. This produces an additional advantage that the hole 20, the uncoated portions and the gate trace of the as-molded state which are of ugly appearance are out of sight.

What is claimed is:

1. A lens mounting comprising:
   (a) a movable cam having a cam portion formed to a convex shape having two side surfaces;
   (b) an axially movable member having a cam follower portion sliding on one of said two side surfaces of said convex cam portion of said cam in which a cam lift is formed;
   (c) a lens arranged to move axially in response to axial movement of said axially movable member; and
   (d) a leaf spring pressing the other side surface of said convex cam portion to urge said cam follower portion toward said one of said two side surfaces of said convex cam portion, said leaf spring having its pressing portion at a position of said convex cam portion and being fixed to said axially movable member at a position displaced to a direction almost perpendicular to the optical axis from said pressing portion.

2. A lens mounting according to claim 1, wherein said cam is formed to a cylindrical shape and said convex cam portion is formed on the inner diameter surface side of said cam.

3. A lens mounting according to claim 1, wherein said cam is formed in a mold by synthetic resin.

4. A lens mounting according to claim 1, wherein said leaf spring has said pressing portion to contact directly with said other side surface of said convex cam portion, so that said convex cam portion is sandwiched between said cam follower portion and said leaf spring.

5. A zoom lens mounting comprising:
   (a) a fixed barrel;
   (b) a cam arranged to move by a driving force, said cam having a cam portion formed to a convex shape;
   (c) a lens holder holding a lens for zooming, said lens holder being supported to be freely movable along an optical axis relative to said fixed barrel, and having a cam follower formed therein to abut on one side surface of said convex cam portion; and
   (d) a leaf spring abutting directly on another side surface of said convex cam portion to urge said cam follower to slide on said one side surface of said convex cam portion, said leaf spring having its pressing portion at a position of said convex cam portion, and being fixed to said lens holder at a position displaced from said pressing portion to a direction almost perpendicular to the optical axis.

6. A zoom lens mounting according to claim 5, wherein said lens holder is freely movable along said optical axis relative to said fixed barrel by a plurality of guide bars, and said cam follower is formed to one in number.

7. A zoom lens mounting according to claim 5, wherein said leaf spring fixed to said lens holder covers an area on said lens holder which is out of sight.

* * * * *

UNITED STATES PATENT AND TRADEMARK OFFICE
CERTIFICATE OF CORRECTION

PATENT NO. : 4,767,200
DATED : August 30, 1988
INVENTOR(S) : Hiroyoshi Inaba, et al.

It is certified that error appears in the above-identified patent and that said Letters Patent is hereby corrected as shown below:

COLUMN 1

Line 11, change "for zoom" to --for a zoom--.

Line 59, change "make" to --makes--.

COLUMN 2

Line 3, change "noted," to --noted that--.

Line 18, change "looked from" to --viewed from--.

Line 32, change "noted," to --noted that--.

Line 33, change "necessary" to --necessary to--.

Line 35, change "instituting" to --parts constituting--.

Line 43, change "in" (second occurrence) to --is--.

Signed and Sealed this

Fourth Day of July, 1989

Attest:

DONALD J. QUIGG

Attesting Officer

Commissioner of Patents and Trademarks